(12) United States Patent
Binfet et al.

(10) Patent No.: US 12,141,437 B2
(45) Date of Patent: Nov. 12, 2024

(54) PROGRAM COMMAND GENERATION WITH DUMMY DATA GENERATION AT A MEMORY DEVICE

(71) Applicant: Micron Technology, Inc., Boise, ID (US)

(72) Inventors: Jeremy Binfet, Boise, ID (US); Violante Moschiano, Avezzano (IT); James Fitzpatrick, Laguna Niguel, CA (US); Kishore Kumar Muccherla, San Jose, CA (US); Jeffrey S. McNeil, Nampa, ID (US); Phong Sy Nguyen, Livermore, CA (US)

(73) Assignee: Micron Technology, Inc., Boise, ID (US)

( * ) Notice: Subject to any disclaimer, the term of this patent is extended or adjusted under 35 U.S.C. 154(b) by 92 days.

(21) Appl. No.: 17/974,799

(22) Filed: Oct. 27, 2022

(65) Prior Publication Data

US 2023/0137866 A1    May 4, 2023

Related U.S. Application Data

(60) Provisional application No. 63/274,773, filed on Nov. 2, 2021.

(51) Int. Cl.
*G06F 3/06*    (2006.01)

(52) U.S. Cl.
CPC .............. *G06F 3/061* (2013.01); *G06F 3/064* (2013.01); *G06F 3/0659* (2013.01); *G06F 3/0679* (2013.01)

(58) Field of Classification Search
CPC ........ G06F 3/061; G06F 3/064; G06F 3/0659; G06F 3/0679
See application file for complete search history.

(56) References Cited

U.S. PATENT DOCUMENTS

| | | | |
|---|---|---|---|
| 2012/0063231 A1* | 3/2012 | Wood | G11C 11/5628 365/185.18 |
| 2017/0115900 A1* | 4/2017 | Camp | G06F 3/0652 |
| 2019/0042112 A1* | 2/2019 | Gangadhar | G11C 29/52 |
| 2019/0325951 A1* | 10/2019 | Kim | G11C 8/14 |
| 2021/0193227 A1* | 6/2021 | Kim | G11C 16/26 |
| 2021/0264981 A1* | 8/2021 | Liu | G11C 16/24 |
| 2022/0206915 A1* | 6/2022 | Li | G06F 3/064 |

* cited by examiner

*Primary Examiner* — Baboucarr Faal
(74) *Attorney, Agent, or Firm* — Lowenstein Sandler LLP

(57) ABSTRACT

A memory device comprising an array of memory cells organized into a set of sub-blocks and a set of wordlines. Control logic is operatively coupled with the array of memory cells, the control logic to perform operations including: receiving a program command from a processing device, the program command including information indicative of a physical address associated with a retired wordline of the set of wordlines; in response to detecting the information within the program command, generating dummy data that is one of pseudo-random data, all one values, or all zero values; and causing the dummy data to be programmed to memory cells of multiple sub-blocks of the set of sub-blocks that are selectively connected to the retired wordline.

20 Claims, 8 Drawing Sheets

400

```
┌─────────────────────────────────────────────────────────┐
│ Determine that a wordline is retired and is sequentially ordered │
│      within multiple wordlines currently being programmed.      │
│                            410                                  │
└─────────────────────────────────────────────────────────┘
                              │
                              ▼
┌─────────────────────────────────────────────────────────┐
│  Generate a dummy program command associated with the   │
│                    retired wordline.                    │
│                           420                           │
└─────────────────────────────────────────────────────────┘
                              │
                              ▼
┌─────────────────────────────────────────────────────────┐
│  Sending, over data interface bus, the dummy program    │
│  command without data to control logic of a die, the dummy │
│   program command to trigger the control logic to direct │
│ generation and programming of dummy data to memory cells │
│    that are selectively connected to the retired wordline. │
│                           430                           │
└─────────────────────────────────────────────────────────┘
```

```
┌─────────────────────────────────────────────────┐
│ Receive a dummy program command from a          │
│ processing device, the dummy program command    │
│ associated with a physical address              │
│ corresponding to a retired wordline of multiple │
│ wordlines of an array of memory cells.          │
│ 510                                             │
└─────────────────────────────────────────────────┘
                        │
                        ▼
┌─────────────────────────────────────────────────┐
│ Generate, in response to the dummy program      │
│ command, dummy data that is one of pseudo-      │
│ random data, all one values, or all zero values.│
│ 520                                             │
└─────────────────────────────────────────────────┘
                        │
                        ▼
┌─────────────────────────────────────────────────┐
│ Cause the dummy data to be programmed to        │
│ memory cells of multiple sub-blocks of the      │
│ memory device that are selectively connected    │
│ to the retired wordline.                        │
│ 530                                             │
└─────────────────────────────────────────────────┘
```

FIG. 5

PROGRAM COMMAND GENERATION WITH DUMMY DATA GENERATION AT A MEMORY DEVICE

REFERENCE TO RELATED APPLICATION

This application claims the benefit of U.S. Provisional Patent Application No. 63/274,773, filed Nov. 2, 2021, the entirety of which is incorporated herein by reference.

TECHNICAL FIELD

Embodiments of the disclosure are generally related to memory sub-systems, and more specifically, relate to a program command with dummy data generation at a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of some embodiments of the disclosure.

FIG. 4 is a flow diagram of a method for generating a dummy program by a memory sub-system controller according to at least one embodiment.

FIG. 5 is a flow diagram of a method for generating and programming dummy data by control logic of a memory device according to at least one embodiment.

DETAILED DESCRIPTION

Figure 1A:
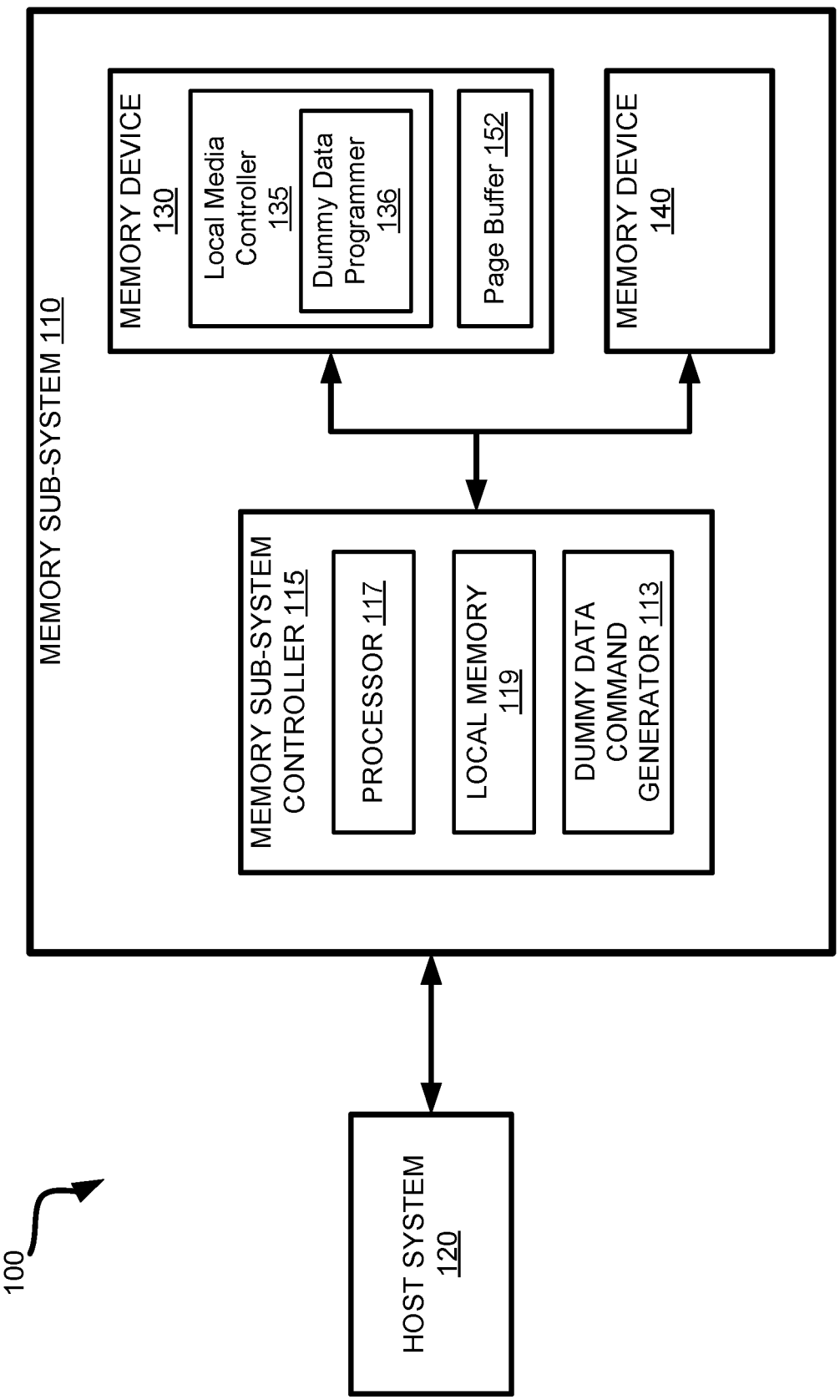
FIG. 1A illustrates an example computing system that includes a memory sub-system according to some embodiments.

Embodiments of the present disclosure are directed to program command generation with dummy data generation at a memory device. Certain memory devices, such as NOT-AND (NAND) memory devices, can be made up of bits arranged in a two-dimensional or three-dimensional grid, also referred to as a memory array. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell.

In these memory devices, programming is performed to the array of memory cells sequentially, e.g., from a top (or lowest-numbered addresses) to a bottom (or highest-numbered addresses) of the array. This approach to programming follows best practices of using up all available memory and balancing program/erase (PE) cycles across the memory cells. Despite such efforts at wear leveling, however, after many PE cycles, memory cells along some wordlines wear out before other memory cells. The level of wear of memory cells selectively connected to a wordline can be quantified by a reliability statistic, such as a read bit error rate (RBER) or other bit error rate of the memory cells being detected that satisfies a threshold value.

In these memory devices, when the memory cells selectively connected to certain wordlines wear out, these wordlines are considered to be associated with "bad blocks," and are retired. A retired wordline is no longer trusted to be programmed with host or system data due to unacceptably high error rates. Although not programmed with host or system data, the memory cells that are selectively connected to the retired wordlines should still be programmed with dummy data because leaving these pages of memory cells unwritten can create unwanted memory cell reliability and trigger rate ramifications at memory cells selectively connected to adjacent wordlines. Dummy data can be understood to be random or meaningless data, e.g., pseudo-random data, all one values, all zero values, or a combination thereof.

To perform this dummy data programming in these memory devices, the memory sub-system controller (e.g., processing device) generates a program command that includes the dummy data and transmits the program command and dummy data to the memory device so that the memory device can transparently program memory cells selectively connected to the retired wordlines with the dummy data. For example, the memory device can act on the program command as any other program command, and no update to control logic of the memory device is necessary. The deficiency of this approach is that each program command carrying dummy data ties up a data interface bus located between the memory sub-system controller and a die of the memory device being programmed, where the data interface bus is shared with other dice of the memory device. A further deficiency is that the memory device is also tied up for a longer period of time reading in the dummy data and performing a normal program operation that includes performing a program verify operation as well. As the memory device gets older, these deficiencies worsen as more and more dummy data is programmed to more and more retired wordlines over time.

Aspects of the present disclosure address the above and other deficiencies by the memory sub-system controller (e.g., processing device) generating a new or different program command (e.g., also referred to herein as a dummy program command) that is sent to the control logic of the memory device. For example, in some embodiments, the processing device determines that a wordline is retired and is sequentially ordered within multiple wordlines currently being programmed, e.g., by multiple other program commands. The processing device can generate a dummy program command associated with the retired wordline. The processing device can then send, over the data interface bus, the dummy program command without data to control logic of the memory device. The dummy program command, for example, can be configured to trigger the control logic to direct the generation and programming of dummy data to memory cells that are selectively connected to the retired wordline. Different embodiments of such a dummy program command will be discussed in detail below.

Further, in some embodiments, the control logic of the memory device receives a program command (e.g., the dummy program command) from the processing device. The program command includes or is attached to information indicative of a physical address associated with the retired wordline, e.g., on one or more dice of the memory device. In these embodiments, in response to detecting the information within the program command, the control logic generates the dummy data that is one of pseudo-random data, all one values, or all zero values. For example, the control logic can use a data randomizer circuit to generate the pseudo-random data. The control logic can further cause the dummy data to be programmed to memory cells of multiple sub-blocks that are selectively connected to the retired wordline.

Therefore, advantages of the systems and methods implemented in accordance with some embodiments of the present disclosure include, but are not limited to, freeing up the data interface bus for other purposes when data is not sent with a dummy program command. Further, a memory device can streamline and reduce the program time (tPROG) of the dummy data in response to receipt of the dummy program command, including generating alternating types of dummy data and foregoing any program verify operations when programming the dummy data. Thus, performance overhead and latency overhead due to programming dummy data to the memory device can be significantly reduced. Other advantages will be apparent to those skilled in the art of programming data to memory devices, which will be discussed hereinafter.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such media or memory devices. The memory sub-system 110 can be a storage device, a memory module, or a hybrid of a storage device and memory module.

The memory device 130 can be a non-volatile memory device. One example of non-volatile memory devices is a NOT-AND (NAND) memory device. A non-volatile memory device is a package of one or more dice. Each die can include one or more planes. Planes can be groups into logic units (LUN). For some types of non-volatile memory devices (e.g., NAND devices), each plane includes a set of physical blocks. Each block includes a set of pages. Each page includes a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1," or combinations of such values.

The memory device 130 can be made up of bits arranged in a two-dimensional or three-dimensional grid, also referred to as a memory array. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. The host system 120 can provide data to be stored at the memory sub-system 110 and can request data to be retrieved from the memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NOT-AND (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple-level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage a memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

In some embodiments, the memory sub-system controller 115 (e.g., processing device) further includes a dummy data command generator 113 that is configured to generate a dummy data command without the dummy data as will be discussed in more detail. In some embodiments, this processing device is integrated in whole or in part within the host system 120. Further, according to various embodiments, the memory device 130 includes a page buffer 152 for each array plane in the memory device 130, which can provide the circuitry used to program data to the memory cells of the memory device 130 and to read the data out of the memory cells. In some embodiments, control logic of the local media controller 135 includes a dummy data programmer 136 that is to receive the dummy data command (or a modified program command), generate dummy data, and program pages of retired wordlines in an array of memory cells (e.g., of a die) of the memory device 130 with the dummy data as will be explained in more detail. In some embodiments, this control logic is integrated in whole or in part within the memory sub-system controller 115 and/or the host system 120.

Figure 1B:
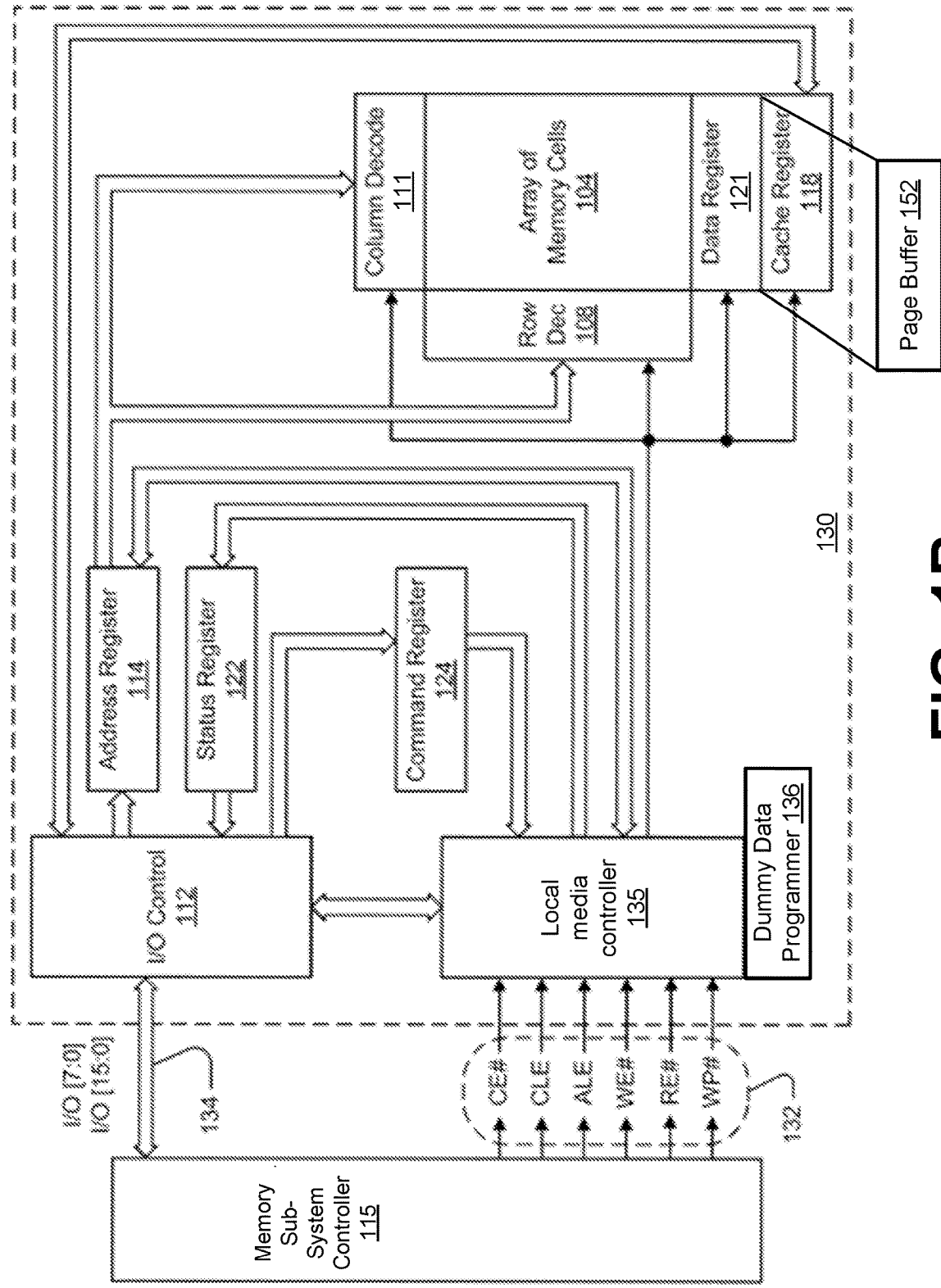
FIG. 1B is a block diagram of a memory device in communication with a memory sub-system controller of a memory sub-system according to an embodiment.

FIG. 1B is a simplified block diagram of a first apparatus, in the form of a memory device 130, in communication with a second apparatus, in the form of a memory sub-system controller 115 of a memory sub-system (e.g., the memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), can be a memory controller or other external host device.

The memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bitline). A single access line can be associated with more than one logical row of memory cells and a single data line can be associated with more than one logical column. Memory cells (not shown in FIG. 1B) of at least a portion of the array of memory cells 104 are capable of being programmed to one of at least two target data states.

Row decode circuitry 108 and column decode circuitry 111 are provided to decode address signals. Address signals are received and decoded to access the array of memory cells 104. The memory device 130 also includes input/output (I/O) control circuitry 112 to manage input of commands, addresses and data to the memory device 130 as well as output of data and status information from the memory device 130. An address register 114 is in communication with the I/O control circuitry 112 and row decode circuitry 108 and column decode circuitry 111 to latch the address signals prior to decoding. A command register 124 is in communication with the I/O control circuitry 112 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 111 to control the row decode circuitry 108 and column decode circuitry 111 in response to the addresses. The local media controller 135 can also include the dummy data programmer 136 that can be employed, in conjunction with other programming logic, to program dummy data to pages of the array of memory cells 104 that are selectively connected to any retired wordlines, as will be discussed.

The local media controller 135 is also in communication with a cache register 118 and a data register 121. The cache register 118 latches data, either incoming or outgoing, as directed by the local media controller 135 to temporarily store data while the array of memory cells 104 is busy writing or reading, respectively, other data. During a program operation (e.g., write operation), data can be passed from the cache register 118 to the data register 121 for transfer to the array of memory cells 104; then new data can be latched in the cache register 118 from the I/O control circuitry 112. During a read operation, data can be passed from the cache register 118 to the I/O control circuitry 112 for output to the memory sub-system controller 115; then new data can be passed from the data register 121 to the cache register 118. The cache register 118 and/or the data register 121 can form (e.g., can form at least a portion of) the page buffer 152 of the memory device 130. The page buffer 152 can further include sensing devices such as a sense amplifier, to sense a data state of a memory cell of the array of memory cells 104, e.g., by sensing a state of a data line connected to that memory cell. A status register 122 can be in communication with I/O control circuitry 112 and the local memory controller 135 to latch the status information for output to the memory sub-system controller 115.

The memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) can be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 134 and outputs data to the memory sub-system controller 115 over I/O bus 134.

For example, the commands can be received over input/output (I/O) pins [7:0] of I/O bus 134 at I/O control circuitry 112 and can then be written into a command register 124. The addresses can be received over input/output (I/O) pins [7:0] of I/O bus 134 at I/O control circuitry 112 and can then be written into address register 114. The data can be received over input/output (I/O) pins [7:0] for an 8-bit device or input/output (I/O) pins [15:0] for a 16-bit device at I/O control circuitry 112 and then can be written into cache register 118. The data can be subsequently written into data register 121 for programming the array of memory cells 104. In at least some embodiments, the I/O bus 134 and the I/O control circuitry 112 are integrated within a data interface bus, such as the data interface bus 125 of FIG. 3.

In an embodiment, cache register 118 can be omitted, and the data can be written directly into data register 121. Data can also be output over input/output (I/O) pins [7:0] for an 8-bit device or input/output (I/O) pins [15:0] for a 16-bit device. Although reference can be made to I/O pins, they can include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) can be used in the various embodiments.

Figure 2A:
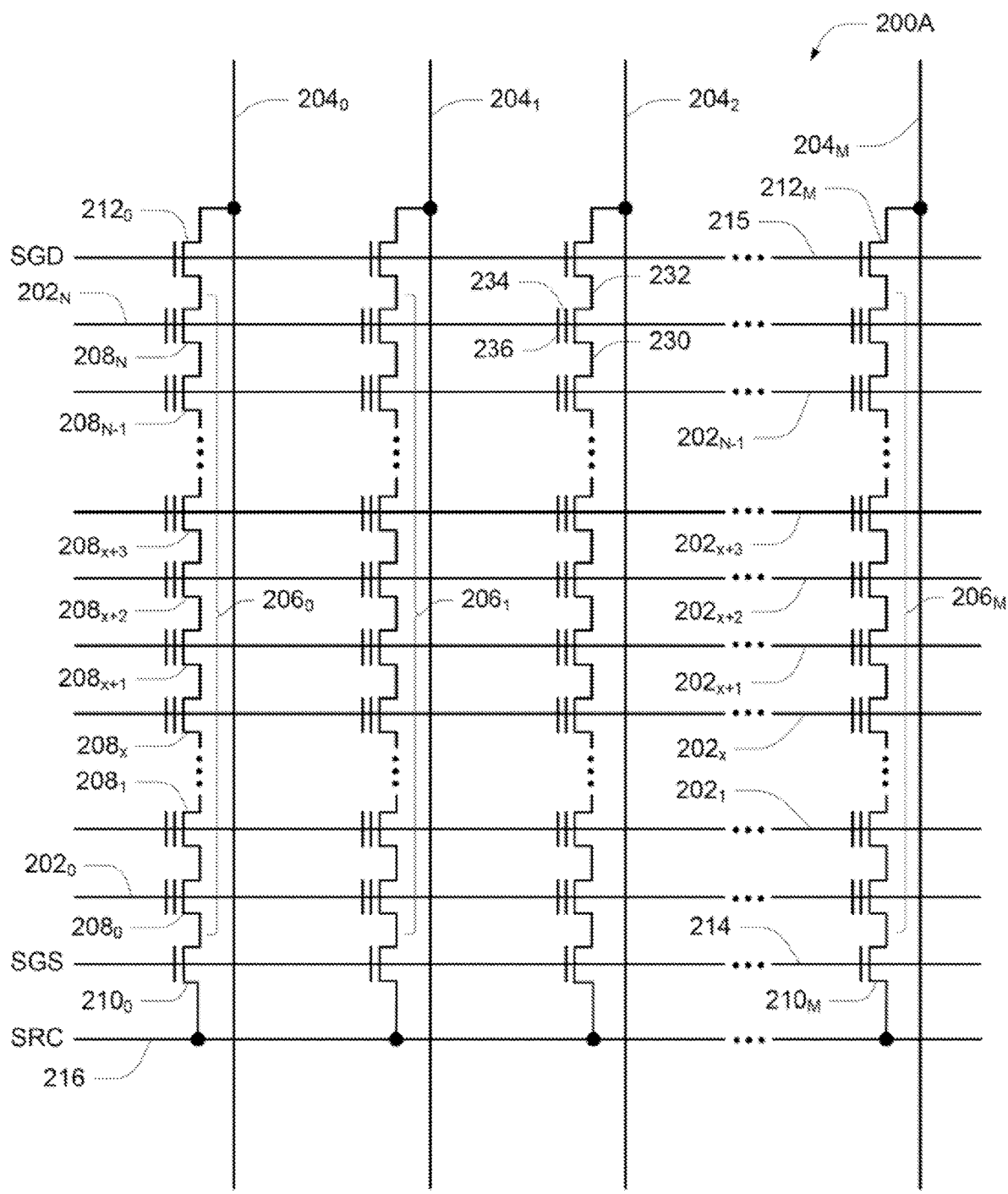
FIG. 2A-2B are schematics of portions of an array of memory cells as could be used in a memory of the type described with reference to FIG. 1B according to an embodiment.
Figure 2B:
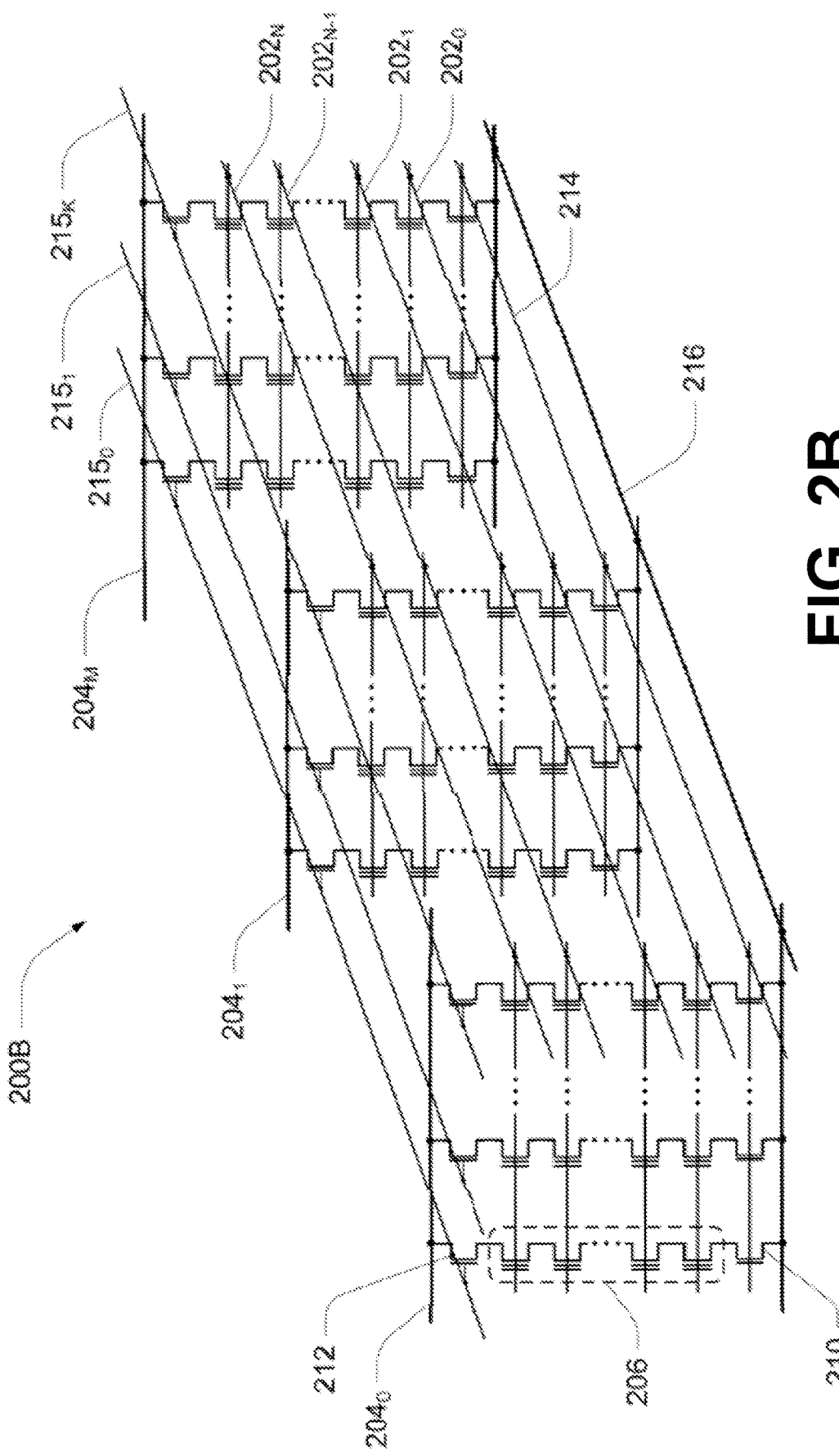

FIG. 2A-2B are schematics of portions of an array of memory cells 200A, such as a NAND memory array, as could be used in a memory of the type described with reference to FIG. 1B according to an embodiment, e.g., as a portion of the array of memory cells 104. Memory array 200A includes access lines, such as wordlines $202_0$ to $202_N$, and data lines, such as bitlines $204_0$ to $204_M$. The wordlines 202 can be connected to global access lines (e.g., global wordlines), not shown in FIG. 2A, in a many-to-one relationship. For some embodiments, memory array 200A can be formed over a semiconductor that, for example, can be conductively doped to have a conductivity type, such as a p-type conductivity, e.g., to form a p-well, or an n-type conductivity, e.g., to form an n-well.

Memory array 200A can be arranged in rows (each corresponding to a wordline 202) and columns (each corresponding to a bitline 204). Each column can include a string of series-connected memory cells (e.g., non-volatile memory cells), such as one of NAND strings $206_0$ to $206_M$. Each NAND string 206 can be connected (e.g., selectively connected) to a common source (SRC) 216 and can include memory cells $208_0$ to $208_N$. Each bitline 204 and NAND string 206 can be associated with a sub-block of a set of sub-blocks of the memory array 200A. The memory cells 208 can represent non-volatile memory cells for storage of data. The memory cells 208 of each NAND string 206 can be connected in series between a select gate 210 (e.g., a field-effect transistor), such as one of the select gates $210_0$ to $210_M$ (e.g., that can be source select transistors, commonly referred to as select gate source), and a select gate 212 (e.g., a field-effect transistor), such as one of the select gates $212_0$ to $212_M$ (e.g., that can be drain select transistors, commonly referred to as select gate drain). Select gates $210_0$ to $210_M$ can be commonly connected to a select line 214, such as a source select line (SGS), and select gates $212_0$ to $212_M$ can be commonly connected to a select line 215, such as a drain select line (SGD). Although depicted as traditional field-effect transistors, the select gates 210 and 212 can utilize a structure similar to (e.g., the same as) the memory cells 208. The select gates 210 and 212 can represent a number of select gates connected in series, with each select gate in series configured to receive a same or independent control signal.

A source of each select gate 210 can be connected to common source 216. The drain of each select gate 210 can be connected to a memory cell $208_0$ of the corresponding NAND string 206. For example, the drain of select gate $210_0$ can be connected to memory cell $208_0$ of the corresponding NAND string $206_0$. Therefore, each select gate 210 can be configured to selectively connect a corresponding NAND string 206 to the common source 216. A control gate of each select gate 210 can be connected to the select line 214.

The drain of each select gate 212 can be connected to the bitline 204 for the corresponding NAND string 206. For example, the drain of select gate $212_0$ can be connected to the bitline $204_0$ for the corresponding NAND string $206_0$. The source of each select gate 212 can be connected to a memory cell $208_N$ of the corresponding NAND string 206. For example, the source of select gate $212_0$ can be connected to memory cell $208_N$ of the corresponding NAND string $206_0$. Therefore, each select gate 212 can be configured to selectively connect a corresponding NAND string 206 to the corresponding bitline 204. A control gate of each select gate 212 can be connected to select line 215.

The memory array 200A in FIG. 2A can be a quasi-two-dimensional memory array and can have a generally planar structure, e.g., where the common source 216, NAND strings 206 and bitlines 204 extend in substantially parallel planes. Alternatively, the memory array 200A in FIG. 2A can be a three-dimensional memory array, e.g., where NAND strings 206 can extend substantially perpendicular to a plane containing the common source 216 and to a plane containing the bitlines 204 that can be substantially parallel to the plane containing the common source 216.

Typical construction of memory cells 208 includes a data-storage structure 234 (e.g., a floating gate, charge trap, and the like) that can determine a data state of the memory cell (e.g., through changes in threshold voltage), and a control gate 236, as shown in FIG. 2A. The data-storage structure 234 can include both conductive and dielectric structures while the control gate 236 is generally formed of one or more conductive materials. In some cases, memory cells 208 can further have a defined source/drain (e.g., source) 230 and a defined source/drain (e.g., drain) 232. The memory cells 208 have their control gates 236 connected to (and in some cases form) a wordline 202.

A column of the memory cells 208 can be a NAND string 206 or a number of NAND strings 206 selectively connected to a given bitline 204. A row of the memory cells 208 can be memory cells 208 commonly connected to a given wordline 202. A row of memory cells 208 can, but need not, include all the memory cells 208 commonly connected to a given wordline 202. Rows of the memory cells 208 can often be divided into one or more groups of physical pages of memory cells 208, and physical pages of the memory cells 208 often include every other memory cell 208 commonly connected to a given wordline 202. For example, the memory cells 208 commonly connected to wordline $202_N$ and selectively connected to even bitlines 204 (e.g., bitlines $204_0$, $204_2$, $204_4$, etc.) can be one physical page of the memory cells 208 (e.g., even memory cells) while memory cells 208 commonly connected to wordline $202_N$ and selectively connected to odd bitlines 204 (e.g., bitlines $204_1$, $204_3$, $204_5$, etc.) can be another physical page of the memory cells 208 (e.g., odd memory cells).

Although bitlines $204_3$-$204_5$ are not explicitly depicted in FIG. 2A, it is apparent from the figure that the bitlines 204 of the array of memory cells 200A can be numbered consecutively from bitline $204_0$ to bitline $204_M$. Other groupings of the memory cells 208 commonly connected to a given wordline 202 can also define a physical page of memory cells 208. For certain memory devices, all memory cells commonly connected to a given wordline can be deemed a physical page of memory cells. The portion of a physical page of memory cells (which, in some embodiments, could still be the entire row) that is read during a single read operation or programmed during a single programming operation (e.g., an upper or lower page of memory cells) can be deemed a logical page of memory cells. A block of memory cells can include those memory cells that are configured to be erased together, such as all memory cells connected to wordlines $202_0$-$202_N$ (e.g., all NAND strings 206 sharing common wordlines 202). Unless expressly distinguished, a reference to a page of memory cells herein refers to the memory cells of a logical page of memory cells. Although the example of FIG. 2A is discussed in conjunction with NAND flash, the embodiments and concepts described herein are not limited to a particular array architecture or structure, and can include other structures (e.g., SONOS, phase change, ferroelectric, etc.) and other architectures (e.g., AND arrays, NOR arrays, etc.).

FIG. 2B is another schematic of a portion of an array of memory cells 200B as could be used in a memory of the type described with reference to FIG. 1B, e.g., as a portion of the array of memory cells 104. Like numbered elements in FIG. 2B correspond to the description as provided with respect to FIG. 2A. FIG. 2B provides additional detail of one example of a three-dimensional NAND memory array structure. The three-dimensional NAND memory array 200B can incorporate vertical structures which can include semiconductor pillars where a portion of a pillar can act as a channel region of the memory cells of NAND strings 206. The NAND strings 206 can be each selectively connected to a bitline $204_0$-$204_M$ by a select transistor 212 (e.g., that can be drain select transistors, commonly referred to as select gate drain) and to a common source 216 by a select transistor 210 (e.g., that can be source select transistors, commonly referred to as select gate source). Multiple NAND strings 206 can be selectively connected to the same bitline 204. Subsets of NAND strings 206 can be connected to their respective bitlines 204 by biasing the select lines $215_0$-$215_K$ to selectively activate particular select transistors 212 each between a NAND string 206 and a bitline 204. The select transistors 210 can be activated by biasing the select line 214. Each wordline 202 can be connected to multiple rows of memory cells of the memory array 200B. Rows of memory cells that are commonly connected to each other by a particular wordline 202 can collectively be referred to as tiers.

Figure 3:
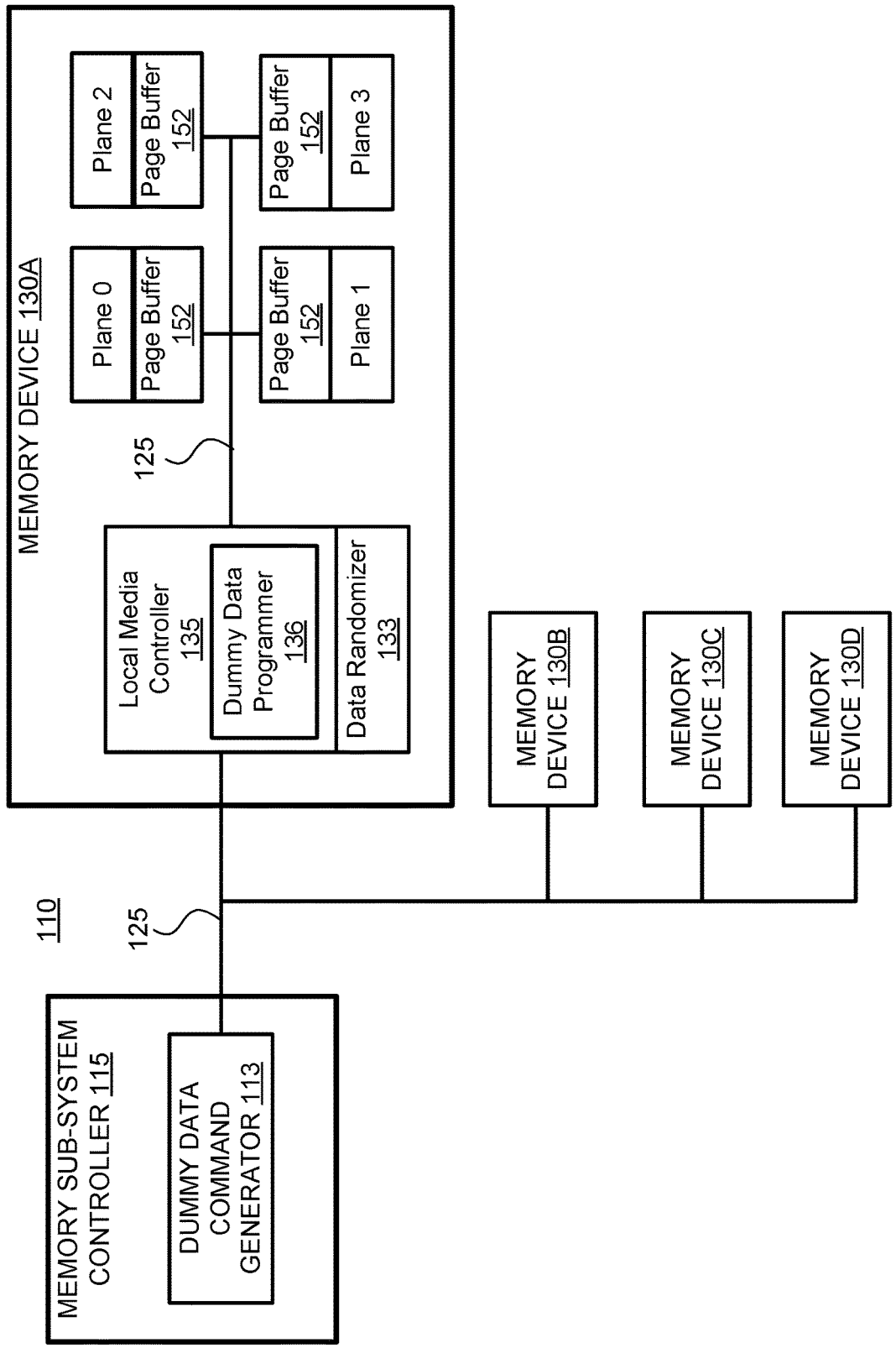
FIG. 3 is a block schematic of a portion of the memory sub-system of FIGS. 1A-1B according to at least some embodiments.

FIG. 3 is a block schematic of a portion of the memory sub-system 110 of FIGS. 1A-1B according to at least some embodiments. For example, in these embodiments, the memory sub-system 110 includes four memory devices, e.g., a first memory device 130A, a second memory device 130B, a third memory device 140C, and a fourth memory device 130D, each of which can be at least one die (or LUN), which share a data interface bus 125. Although four memory devices are illustrated, this is for purposes of explanation and more or fewer are also envisioned. In some embodiments, the data interface bus 125 is an Open NAND Flash Interface (ONFI) bus.

The first memory device 130A is representative of each die, which can include the local media controller 135, which in turn can include or be coupled with a data randomizer circuit 133, and one or more planes, e.g., Plane 0, Plane 1, Plane 2, and Plane 3. In some embodiments, each plane corresponds to a stripe that is programmable across the multiple dice of the four memory devices and there is at least one die per chip enable signal of the memory sub-system 110. The data randomizer 133 can generate pseudo-random bits of data. In some embodiments, the pseudo-random data is buffered into the page buffer 152 of one of the planes before being programmed into that plane.

In at least some embodiments, a system such as the memory sub-system 110, includes a die (e.g., the first memory device 130A) having an array of memory cells organized into a set of sub-blocks and multiple wordlines (such as illustrated in FIGS. 2A-2B). The system can further include the data interface bus 125, which is coupled between the controller 115 and each of the dice (e.g., the memory devices 130A, 130B, 130C, and 130D). In these embodiments, the memory sub-system controller 115 is a processing device operatively coupled with the multiple dice via the data interface bus 125, where the local media controller 135 of each die is positioned along the data interface bus 125 between the controller 115 and the memory array of each respective die. The data interface bus 125 can thus be understood to be an ONFI channel (or other memory interface protocol channel) that his shared between the four planes of each dice coupled with the controller 115. Some systems include multiple multi-dice memory devices with an additional shared ONFI channel for each additional multi-dice memory device in the memory sub-system.

In at least these embodiments, the one or more dice (corresponding to the one or more LUNs) can include a number of wordlines that have been retired due to satisfying some threshold value of RBER or other error rate. Table 1 illustrates an example of four sub-blocks (SB0, SB1, SB2, SB3) and a list of wordlines (WLn through WLn+15) selectively connected to the four sub-blocks for purposes of explanation only. Table 1 illustrates that some of the memory cells selectively connected to some of the wordlines are associated with bad block(s).

TABLE 1

|          | SB0  | SB1  | SB2  | SB3  |
|----------|------|------|------|------|
| WLn      | Good | Good | Good | Good |
| WLn + 1  | Good | Good | Good | Good |
| WLn + 2  | Bad  | Bad  | Bad  | Bad  |
| WLn + 3  | Good | Good | Good | Good |
| WLn + 4  | Good | Good | Good | Good |
| WLn + 5  | Good | Good | Good | Good |
| WLn + 6  | Bad  | Bad  | Bad  | Bad  |
| WLn + 7  | Bad  | Bad  | Bad  | Bad  |
| WLn + 8  | Bad  | Bad  | Bad  | Bad  |
| WLn + 9  | Bad  | Bad  | Bad  | Bad  |
| WLn + 10 | Good | Good | Good | Good |
| ...      | ...  | ...  | ...  | ...  |
| WLn + 15 | Good | Good | Good | Good |

These "Bad" wordlines have been retired while the "Good" wordlines have not been retired, as illustrated in Table 1 by way of example. Retired wordlines are not trusted to be programmed with host or system data due to unacceptably high error rates. Although not programmed with host or system data, the memory cells that are selectively connected to the retired wordlines should still be programmed with dummy data because leaving these pages of memory cells unwritten can create unwanted memory cell reliability and trigger rate ramifications at memory cells selectively connected to adjacent wordlines, e.g., at the "good" wordlines. Dummy data can be understood to be random or meaningless data, e.g., pseudo-random data, all one values, or all zero values, or a combination thereof.

In these embodiments, the processing device (e.g., the dummy data command generator 113) is configured to perform operations including determining that a wordline of the multiple wordlines is retired and is sequentially ordered within the multiple wordlines currently being programmed. For example, FIG. 2A illustrates wordlines $202_0$ to $202_N$ that are sequentially ordered, so one or more of these wordlines can be retired. In other words, the processing device can detect that the retired wordline is interposed among multiple wordlines of the list of wordlines that are also being controlled by the local media controller 135 to program actual data received from the processing device, as illustrated by the "bad" wordlines positioned sequentially between other "good" wordlines in Table 1. The operations can further include generating a dummy program command associated with the retired wordline. The operations can further include sending, over the data interface bus 125, the dummy program command without data (or unassociated with data) to control logic of the die, e.g., to the local media controller 135 for handling by the dummy data programmer 136.

The dummy program command can be adapted to trigger the control logic of the dummy data programmer 136 to control generation and programming of dummy data to memory cells that are selectively connected to the retired wordline. For example, in some embodiments, the dummy data command is a typical program command (e.g., 80 h) having a bit that is one of a prefix bit or a bit included within an address field of the program command. The prefix bit, for example, may be a bit appended to the front of the program command to signal to the control logic to handle as a dummy program command. When the bit is included within the address field, the control logic detects that this is a dummy program command when detecting the extra address bit.

In other embodiments, the dummy program command is a memory command having a different value (e.g., 100 h) than that of the typical program command (e.g., 80 h), which contains data to be programmed to the array of memory cells. In this way, the dummy program command (e.g., 100 h) can be a completely new program command that by itself signals to the dummy data programmer 136 to take over handling programming dummy data to the memory cells associated with one or more addresses of retired wordlines.

In further embodiments, the dummy program command is a set feature command that causes a bit to be stored in a reserved location in the array of memory cells. In these embodiments, the bit indicates to the control logic of the memory device 130 that a subsequently received program command contains a physical address of the retired wordline for which the dummy data is to be generated and programmed. This set feature command would therefore be sequentially issued before the typical program command (e.g., 80 h) having no data, but that is associated with the retired wordline.

In at least some embodiments, the die is a first die (e.g., the first memory device 130A), and the operations performed by the controller 115 further includes generating a memory command that is to cause a second die (e.g., the second memory device 130B) coupled with the data interface bus 125 to perform a memory operation that engages the data interface bus 125. The operations further include sending the memory command to the second die so that the memory operation is performed by the second die while the first die is programming the dummy data to the memory cells of the first die. This memory operation can, for example, be another program command that requires data be loaded from the controller 115 into the second memory device 130B for programming. By enabling the first memory device 130A to handle the generation and programming of the dummy data to its memory array, the data interface bus 125 is freed for loading this other data to be programmed by the second memory device 130B. The loading of the data can be buffered into another of multiple page buffers of the second memory device 130B, for example, even if one of the page buffers 152 of the first memory device 130B is taken to buffer dummy data generated by the dummy data programmer 136.

In at least some embodiments, the control logic (e.g., of the dummy data programmer 136) performs operations that include receiving a program command from the processing device (e.g., the controller 115). The program command includes information indicative of a physical address associated with a retired wordline of the multiple wordlines. In one or more embodiments, this program command is any one of the dummy program commands that the dummy data command generator 113 can generate, as was discussed previously.

The operations further include, in response to detecting the information within the program command, generating dummy data that is one of pseudo-random data, all one values, all zero values, or a combination thereof. When generating the pseudo-random data, the control logic can use the data randomizer circuit 133. The operations can further include causing the dummy data to be programmed to memory cells of multiple sub-blocks of the set of sub-blocks that are selectively connected to the retired wordline, e.g., of the first die. In at least some embodiments, causing the dummy data to be programmed to the memory cells of the multiple sub-blocks is performed without performing a program verify at the multiple sub-blocks due to not caring about whether these memory cells are fully programmed. Skipping the program verify can further improve program time (tPROG) of the dummy data, reducing the performance and bandwidth impacts of having to program the dummy data to the retired wordlines.

In at least some embodiments, the operations performed by the local media controller 135 further include receiving multiple program commands (e.g., multiple dummy program commands), which include the program command. The operations further include determining that each of the multiple program commands is directed to a physical address associated with a retired wordline of a multiple retired wordlines. The operations further include alternating between programming all one values and all zero values to memory cells selectively connected to respective retired wordlines of the multiple retired wordlines.

In at least some embodiments, when dealing with multiple retired wordlines, the operations performed by the local media controller 135 further include buffering an amount of the dummy data that is sufficient for programming the memory cells that are selectively connected to each retired wordline of the multiple wordlines. The operations can further include causing the dummy data to be sequentially programmed to multiple sub-blocks that are selectively connected to each retired wordline of the multiple retired wordlines. The operations can further include suspending the programming of the dummy data in response to a suspend command, e.g., which is received to interrupt a series of programming to multiple retired wordlines in order to complete another memory operation. This other memory operation, for example, can be a read operation or another program operation to program to memory cells selectively connected to good wordlines.

Further applications of the present embodiments can include filling, with dummy data, SLC page buffers used for QLC coarse data buffering. A further application can include extending QLC block endurance. For example, some memory devices use QLC super blocks with bad block holes. Different QLC super blocks have a different bad block hole imprint.

In architectures that sequentially program logical addresses (e.g., logical block address or LBAs) to sequential physical addresses of one or more dice, coarse data from different QLC super blocks are buffered in a common SLC super block, e.g., when folded back down to SLC memory to be read out or moved to another QLC block. Since an SLC super block needs to accept data from a variety of bad-block-hole-imprinted QLC super blocks, the SLC super block should not have bad block holes. When a super page of the QLC super block with a bad block hole is written to an SLC super page, the page corresponding to a bad block hole does not carry any data. The memory device 130 can thus regenerate dummy data and write the dummy data to these super pages, and thus, the memory device 130 need not expend resources folding dummy data from the QLC super block when the memory device 130 can just generate and write any dummy data to the SLC super page.

FIG. 4 is a flow diagram of a method 400 for generating a dummy program by a memory sub-system controller according to at least one embodiment. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the sub-system memory controller 115 (e.g., control logic) of FIGS. 1A-1B, e.g., by the dummy data command generator 113. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, a retired wordline is detected. More specifically, the processing logic determines that a wordline of a list of wordlines is retired and is sequentially ordered within multiple wordlines currently being programmed.

At operation 420, a dummy program command is generated. More specifically, the processing logic generates a dummy program command associated with the retired wordline. The dummy program command can be any program command that was discussed with reference to FIG. 3.

At operation 430, the dummy program command is sent. More specifically, the processing logic sends, over the data interface bus, the dummy program command without data to control logic of the die. In these embodiments, the dummy program command triggers the control logic (e.g., of the dummy data programmer 136) to direct generation and programming of dummy data to memory cells that are selectively connected to the retired wordline.

FIG. 5 is a flow diagram of a method 500 for generating and programming dummy data by control logic of a memory device according to at least one embodiment. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the local media controller 135 of FIGS. 1A-1B, e.g., by control logic of the dummy data programmer 136. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, a dummy program command is received. More specifically, the processing logic receives a dummy program command from a processing device, the dummy program command associated with a physical address corresponding to a retired wordline of a list of wordlines of an array of memory cells. In some embodiments, the program command may be sent with other program commands that are associated with good data, and thus the processing logic is configured to distinguish between the dummy program command and these other program commands. The processing logic can also distinguish between data received through other I/O channels associated with regular program commands in contrast to associating such data with a dummy program command, which is not accompanied or associated with host or user data.

At operation 520, dummy data is generated. More specifically, the processing logic generates, in response to the dummy program command, dummy data that is one of pseudo-random data, all one values, or all zero values. In some embodiments, generating the pseudo-random data includes: triggering the data randomizer circuit 133 to generate the pseudo-random data; and buffering the pseudo-random data before the pseudo-random data is programmed to the memory cells.

In some embodiments, the dummy program command is a program command including a bit that is one of a prefix bit or a bit included within an address field of the program command, the bit indicative of the physical address corresponding to the retired wordline.

In some embodiments, the dummy program command is a set feature command, and the processing logic further causes a bit associated with the set feature command to be stored in a reserved location in the array of memory cells. In response to detecting the bit stored at the reserved location, the processing logic retrieves the physical address from a subsequently received program command having no data, the physical address corresponding to the retired wordline.

At operation 530, the dummy data is programmed. More specifically, the processing logic causes the dummy data to be programmed to memory cells of multiple sub-blocks of the memory device that are selectively connected to the retired wordline. In some embodiments, causing the dummy data to be programmed to the memory cells of the multiple sub-blocks is performed without performing a program verify at the multiple sub-blocks.

In at least some embodiments, multiple program commands are received that include the program command. In these embodiments, the processing logic determines that each of the plurality of program commands is directed to a physical address associated with a retired wordline of a plurality of retired wordlines. The processing logic further alternates between programming all one values and all zero values to memory cells selectively connected to respective retired wordlines of the plurality of wordlines.

In at least some embodiment, when the program command is associated with multiple retired wordlines, the processing logic further buffers an amount of the dummy data that is sufficient for programming to each retired wordline of the plurality of wordlines. The processing logic can further cause the dummy data to be sequentially programmed to multiple sub-blocks that are selectively connected to each retired wordline of the plurality of retired wordlines. The processing logic can further suspend the programming of the dummy data in response to a suspend command.

Figure 6:
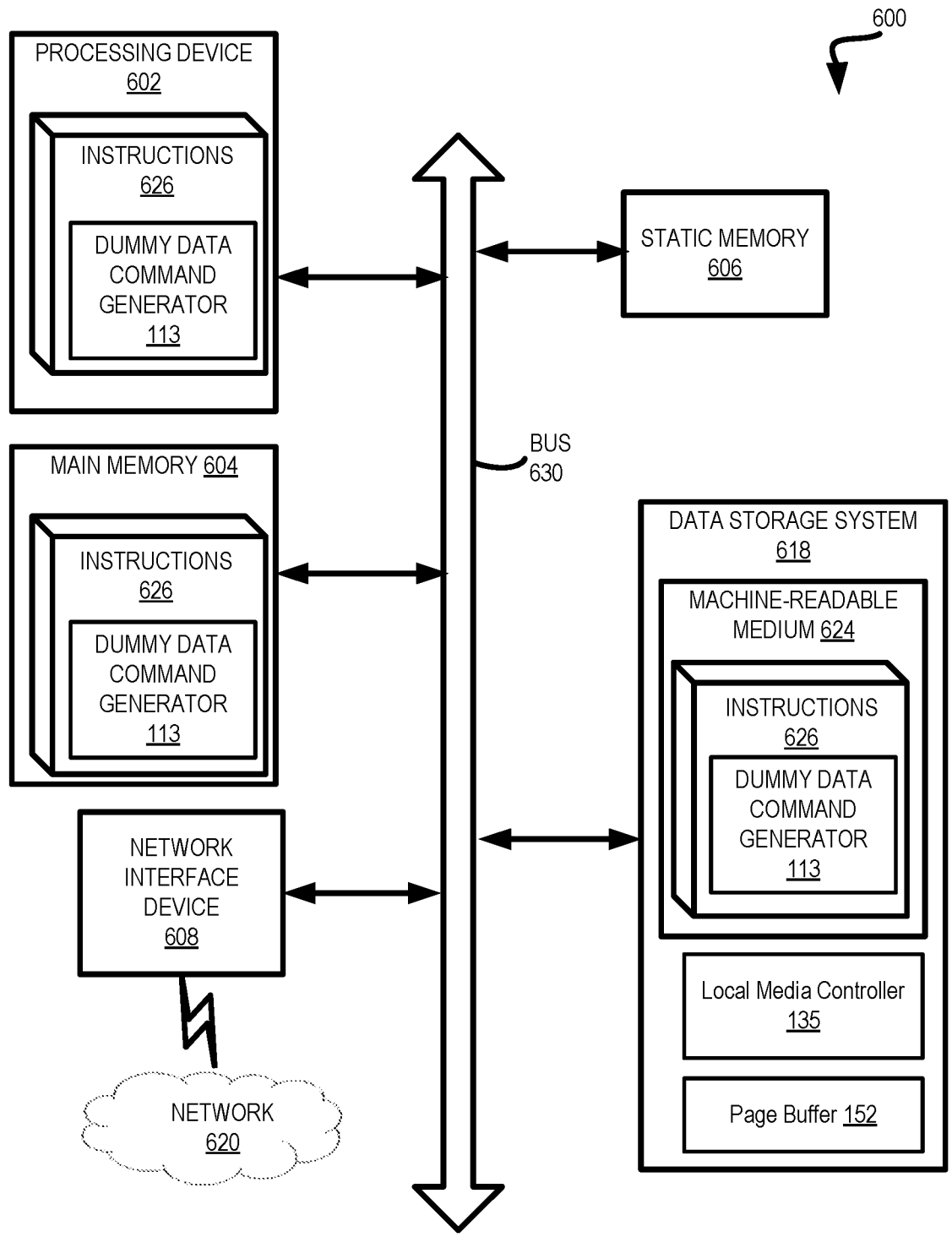
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the memory sub-system controller 115 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 610 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 628 for performing the operations and steps discussed herein. The computer system 600 can further include a network interface device 612 to communicate over the network 620.

The data storage system 618 can include a machine-readable storage medium 624 (also known as a computer-readable medium) on which is stored one or more sets of instructions 628 or software embodying any one or more of the methodologies or functions described herein. The data storage system 618 can further include the local media controller 135 and the page buffer 152 or 352 that were previously discussed. The instructions 628 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1A.

In one embodiment, the instructions 626 include instructions to implement functionality corresponding to a controller (e.g., the memory sub-system controller 115 of FIG. 1A-1B), e.g., which can include the dummy data command generator 113 in various embodiments. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
   an array of memory cells organized into a plurality of sub-blocks and a plurality of wordlines; and
   control logic operatively coupled with the array of memory cells, the control logic to perform operations comprising:
      receiving a program command from a processing device of a memory sub-system, the program command comprising a bit indicating that a physical address of the program command is associated with a retired wordline of the plurality of wordlines;
      in response to detecting the bit within the program command, generating dummy data that is one of pseudo-random data, all one values, or all zero values; and
      causing the dummy data to be programmed to memory cells of multiple sub-blocks of the plurality of sub-blocks that are selectively connected to the retired wordline.

2. The memory device of claim 1, further comprising a data randomizer circuit coupled with the control logic, wherein the operations further comprise generating the pseudo-random data using the data randomizer circuit.

3. The memory device of claim 1, wherein the program command does not carry any data from the processing device, and wherein the bit is one of a prefix bit or a bit included within an address field of the program command.

4. The memory device of claim 1, wherein the retired wordline is interposed among multiple wordlines of the plurality of wordlines that are also being controlled by the control logic to program actual data received from the processing device.

5. The memory device of claim 1, wherein causing the dummy data to be programmed to the memory cells of the multiple sub-blocks is performed without performing a program verify at the multiple sub-blocks.

6. The memory device of claim 1, wherein the operations further comprise:
   receiving a plurality of program commands, which include the program command;
   determining that each of the plurality of program commands is directed to a physical address associated with a retired wordline of a plurality of retired wordlines; and
   alternating between programming all one values and all zero values to memory cells selectively connected to respective retired wordlines of the plurality of retired wordlines.

7. The memory device of claim 1, wherein the program command is further associated with a plurality of retired wordlines, and the operations further comprise:
   buffering an amount of the dummy data that is sufficient for programming to the memory cells selectively connected to each retired wordline of the plurality of wordlines;
   causing the dummy data to be sequentially programmed to multiple sub-blocks that are selectively connected to each retired wordline of the plurality of retired wordlines; and
   suspending the programming of the dummy data in response to a suspend command.

8. A system comprising:
   a die comprising an array of memory cells organized into a plurality of sub-blocks and a plurality of wordlines;
   a data interface bus; and
   a processing device operatively coupled with the die via the data interface bus, the processing device to perform operations comprising:
      determining that a wordline of the plurality of wordlines is retired and is sequentially ordered within multiple wordlines currently being programmed;
      generating a dummy program command associated with the retired wordline; and
      sending, over the data interface bus, the dummy program command without data to control logic of the die, the dummy program command comprising a bit to trigger the control logic to direct generation and programming of dummy data to memory cells that are selectively connected to the retired wordline.

9. The system of claim 8, wherein the dummy data is one of pseudo-random data, all one values, or all zero values that the control logic of the die causes to be generated.

10. The system of claim 8, wherein the dummy program command is a memory command having a different value than that of a program command that contains data to be programmed to the array of memory cells.

11. The system of claim 8, wherein the bit is one of a prefix bit or a bit included within an address field of the dummy program command.

12. The system of claim 8, wherein the dummy program command is a set feature command that causes the bit to be stored in a reserved location in the array of memory cells, the bit to indicate to the control logic that a subsequently received program command contains a physical address of the retired wordline for which the dummy data is to be generated and programmed.

13. The system of claim 8, wherein the die is a first die, and wherein the operations further comprise:
- generating a memory command that is to cause a second die coupled with the data interface bus to perform a memory operation that engages the data interface bus; and
- sending the memory command to the second die so that the memory operation is performed by the second die while the first die is programming the dummy data to the memory cells of the first die.

14. A method comprising:
- receiving, by control logic of a memory device, a dummy program command from a processing device of a memory sub-system, the dummy program command comprising a bit indicating that a physical address of the program command corresponds to a retired wordline of a plurality of wordlines of an array of memory cells;
- generating, by the control logic in response to detecting the bit within the dummy program command, dummy data that is one of pseudo-random data, all one values, or all zero values; and
- causing, by the control logic, the dummy data to be programmed to memory cells of multiple sub-blocks of the memory device that are selectively connected to the retired wordline.

15. The method of claim 14, wherein generating the pseudo-random data comprises:
- triggering a data randomizer circuit to generate the pseudo-random data; and
- buffering the pseudo-random data before the pseudo-random data is programmed to the memory cells.

16. The method of claim 14, wherein the bit is one of a prefix bit or a bit included within an address field of the dummy program command.

17. The method of claim 14, wherein the dummy program command is a set feature command, the method further comprising:
- causing the bit associated with the set feature command to be stored in a reserved location in the array of memory cells; and
- in response to detecting the bit stored at the reserved location, retrieving the physical address from a subsequently received program command having no data, the physical address corresponding to the retired wordline.

18. The method of claim 14, wherein causing the dummy data to be programmed to the memory cells of the multiple sub-blocks is performed without performing a program verify at the multiple sub-blocks.

19. The method of claim 14, further comprising:
- receiving a plurality of program commands, which include the program command;
- determining that each of the plurality of program commands is directed to a physical address associated with a retired wordline of a plurality of retired wordlines; and
- alternating between programming all one values and all zero values to memory cells selectively connected to respective retired wordlines of the plurality of retired wordlines.

20. The method of claim 14, wherein the program command is further associated with a plurality of retired wordlines, the method further comprising:
- buffering an amount of the dummy data that is sufficient for programming the memory cells that are selectively connected to each retired wordline of the plurality of wordlines;
- causing the dummy data to be sequentially programmed to multiple sub-blocks that are selectively connected to each retired wordline of the plurality of retired wordlines; and
- suspending the programming of the dummy data in response to a suspend command.

* * * * *